(12) United States Patent
Datas et al.

(10) Patent No.: US 11,312,505 B2
(45) Date of Patent: Apr. 26, 2022

(54) MOBILE SUPPORT STRUCTURE FOR ASSEMBLING A FUSELAGE SECTION, AND PROCEDURE FOR ASSEMBLING SUCH A SECTION

(71) Applicants: Airbus (S.A.S.), Blagnac (FR); Airbus Operations (S.A.S.), Toulouse (FR)

(72) Inventors: Jean-Marc Datas, Toulouse (FR); Jacques Bouriquet, Toulouse (FR); Jean-Mickael Brindeau, Blagnac (FR); André Aquila, Blagnac (FR); Patrick Guibert, Blagnac (FR)

(73) Assignees: Airbus (S.A.S.), Blagnac (FR); Airbus Operations (S.A.S.), Toulouse (FR)

( * ) Notice: Subject to any disclaimer, the term of this patent is extended or adjusted under 35 U.S.C. 154(b) by 0 days.

(21) Appl. No.: 17/131,206

(22) Filed: Dec. 22, 2020

(65) Prior Publication Data

US 2021/0197984 A1 Jul. 1, 2021

(30) Foreign Application Priority Data

Dec. 31, 2019 (FR) ...................................... 1915770

(51) Int. Cl.
*B64F 5/10* (2017.01)
*B64F 5/50* (2017.01)

(52) U.S. Cl.
CPC . *B64F 5/10* (2017.01); *B64F 5/50* (2017.01)

(58) Field of Classification Search
CPC ................ B64F 5/10; B64F 5/50; B64C 1/12
See application file for complete search history.

(56) References Cited

U.S. PATENT DOCUMENTS 9,610,738 B2 * 4/2017 Gallant ................. B29C 33/301
2012/0066907 A1 * 3/2012 Gallant .................... B64C 1/12
29/897.2

FOREIGN PATENT DOCUMENTS

WO WO 2010/136717 A2 12/2010

OTHER PUBLICATIONS

French Search Report for Application No. 1915770 dated Sep. 9, 2020.

* cited by examiner

*Primary Examiner* — Lawrence Averick
(74) *Attorney, Agent, or Firm* — Jenkins, Wilson, Taylor & Hunt, P.A.

(57) ABSTRACT

To reduce the footprint of an installation for assembling a fuselage section, a support structure includes a chassis and a core mounted so that it can rotate relative to the chassis about an axis of rotation of the core. The core includes a fastener(s) for holding the longitudinal fuselage portions around the core, with a view to assembling them to form the fuselage section. The support structure includes one or more rolling elements provided on the chassis, in order to allow the movement of this support structure within the installation.

19 Claims, 14 Drawing Sheets

MOBILE SUPPORT STRUCTURE FOR ASSEMBLING A FUSELAGE SECTION, AND PROCEDURE FOR ASSEMBLING SUCH A SECTION

CROSS-REFERENCE TO RELATED APPLICATION

This application claims the benefit of and priority to French patent application FR 19 15770 filed on Dec. 31, 2019, the entire disclosure of which is incorporated by reference herein.

TECHNICAL FIELD

The disclosure herein relates to an installation for assembling an aircraft fuselage section, suitable for being obtained by assembling several longitudinal fuselage portions, each forming an angular sector of the section. It relates more particularly to a support structure that forms an integral part of the installation, and is suitable for holding the longitudinal fuselage portions during the assembly thereof.

The disclosure herein applies preferably, but not exclusively, to an installation for assembling a fuselage section of a commercial aeroplane.

BACKGROUND

Conventionally, an aircraft fuselage is manufactured by producing several fuselage sections independently of each other, and then assembling these sections end to end.

Each fuselage section of the aircraft is thus produced within an installation, usually from several longitudinal fuselage portions that are fastened to each other at their circumferential ends. These longitudinal fuselage portions are also known as "fuselage skin panels". To this end, the installation usually includes a plurality of stations, in which one or more specific operations are carried out. These can be, for example, mounting the longitudinal fuselage portions on a support structure or, subsequently, fastening the circumferential ends via their frames and/or skins.

To travel from one station to another within the installation, the assembly being assembled is generally moved using a crane or a gantry. These lifting and moving structures are bulky, and have a significant impact on the overall footprint of the installation. In addition, the nature of these structure can require the precise relative positioning of certain stations, which can have a further detrimental impact on the overall footprint of the installation.

SUMMARY

In order to overcome the drawbacks mentioned above, the disclosure herein firstly relates to a support structure for assembling a fuselage section, the support structure comprising a chassis, and further including a core mounted so that it can rotate relative to the chassis about an axis of rotation of the core, the core comprising fasteners for holding the longitudinal fuselage portions around the core, with a view to assembling them to form the fuselage section, and the support structure including one or more movement elements provided on the chassis, in order to allow the movement of this support structure.

The support structure according to the disclosure herein is thus mobile within the installation for assembling the fuselage section. This specific feature allows it to move freely between the different stations of the installation, with the longitudinal fuselage portions fastened to the core of this support structure. This advantageously makes it possible to make the installation more compact, in particular as there is greater freedom of positioning of the different stations within the installation. Moreover, this design reduces, or even eliminates, the presence of cranes/gantries or similar elements within the installation, as these bulky elements are usually provided to move the fuselage section during the assembly thereof, between the different stations of the installation.

Finally, the rotating core incorporated into the support structure also contributes to reducing the footprint of the installation. The rotating character of the core allows it to change angular position, for example in order to successively mount several longitudinal fuselage portions from a single area adjacent to the core, or to carry out fastening operations on different joints between the longitudinal fuselage portions supported by the core, also from a single area adjacent to the core.

The disclosure herein preferably provides at least one of the following optional features, taken individually or in combination.

The support structure also includes, incorporated into the core, a first work platform allowing operators to move around inside the core, when this first platform is oriented horizontally upwards.

The support structure includes, incorporated into the core, a second work platform allowing operators to move around inside the core, when this second platform is oriented horizontally upwards.

The first and second platforms are arranged facing each other, preferably axisymmetrically relative to the axis of rotation of the core.

The core is produced using two opposite longitudinal end members, and at least one longitudinal beam connecting the two end members and forming the first platform.

More preferably, the core is produced using at least two longitudinal beams connecting the two opposite longitudinal end members of the core, the two longitudinal beams respectively forming the first and second platforms.

At least one of the two longitudinal end members of the core has a passageway giving access to the first platform, inside the core.

The core also includes at least one first additional work platform arranged parallel and laterally relative to the first platform, the first additional work platform being height-adjustable relative to the first platform, and preferably, at least two first additional work platforms are respectively arranged laterally on either side of the first platform.

The first additional work platform is produced from several longitudinal segments that succeed each other and are height-adjustable independently of each other.

The core also includes at least one second additional work platform arranged parallel and laterally relative to the second platform, the second additional work platform being height-adjustable relative to the second platform, and preferably, at least two second additional work platforms are respectively arranged laterally on either side of the second platform.

The first platform bears at least some of the fasteners for holding the longitudinal fuselage portions around the core.

The chassis is produced from two chassis modules spaced apart from each other about the axis of rotation of the core, each of the two chassis modules comprising a rotating support receiving a longitudinal core end, and each of the two chassis modules being provided with one or more rolling elements allowing the movement of the support structure.

The disclosure herein also relates to an installation for assembling a fuselage section, comprising a plurality of stations, together with a support structure as described above, that is mobile between the stations.

The disclosure herein also relates to a method for assembling a fuselage section using such an installation, in which method the support structure, bearing the longitudinal fuselage portions, is moved between the stations of the installation. Preferably, the method comprises at least one step carried out within a station of the installation, on the longitudinal fuselage portions borne by the support structure, during which step:

operations are carried out by at least one operator moving around on the first work platform oriented horizontally upwards; then the core is rotated relative to the chassis, so that the second platform is in turn oriented horizontally upwards; then operations are carried out by at least one operator moving around on the second work platform oriented horizontally upwards.

Further advantages and features of the disclosure herein will become apparent on reading the detailed, non-limiting description below.

BRIEF DESCRIPTION OF THE DRAWINGS

This description will be given with reference to the attached drawings, in which.

DETAILED DESCRIPTION

Figure 1:
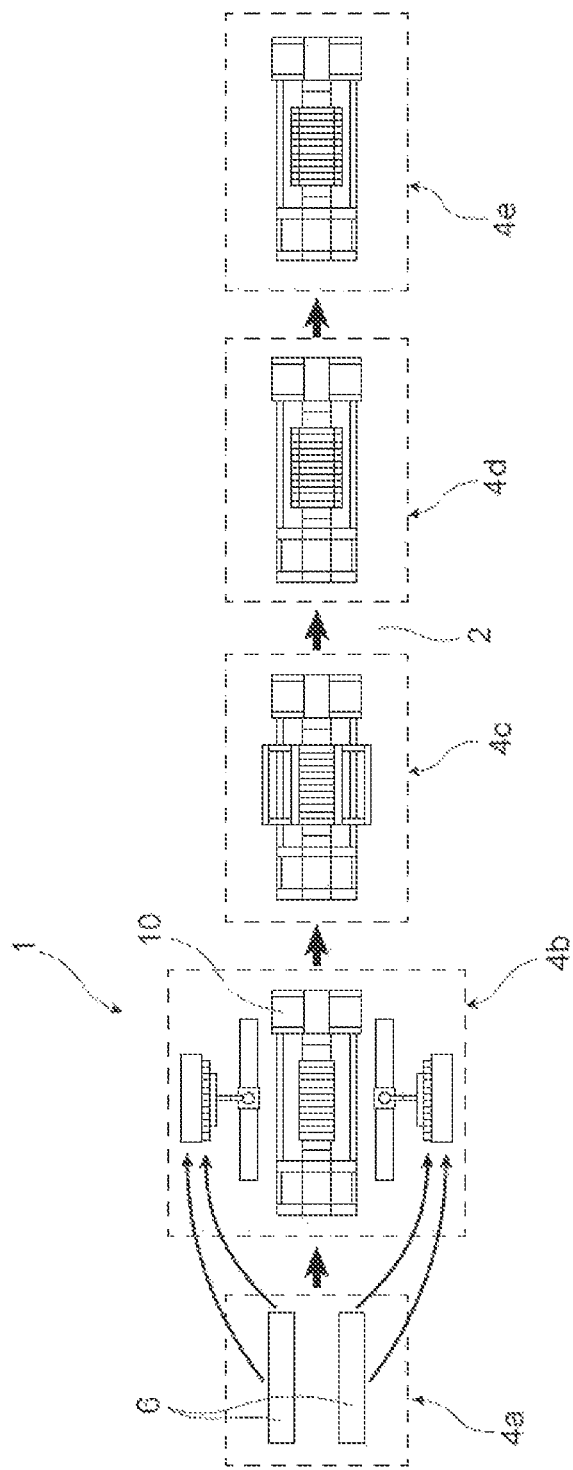
FIG. 1 is a schematic top view of an installation according to a preferred embodiment of the disclosure herein, for assembling an aircraft fuselage section.

FIG. 1 shows an installation 1 for assembling an aircraft fuselage section, according to a preferred embodiment of the disclosure herein. This installation 1 corresponds to a hangar in which a plurality of stations is located, together with a support structure that is mobile on the floor 2 between these different stations.

In the embodiment shown in FIG. 1, the stations are aligned with each other, but other non-linear arrangements could be adopted without departing from the scope of the disclosure herein. Moreover, a single assembly line has been shown, but multiple parallel lines can be envisaged, so that several fuselage sections are assembled simultaneously.

The installation 1 firstly includes a station 4a for storing the longitudinal fuselage portions, these portions forming angular sectors of the section, and being stored individually or in groups in appropriate containers 6.

Next, the installation 1 includes a station 4b for loading the longitudinal fuselage portions onto a support structure 10 specific to the disclosure herein, which will be described in detail below. This station 4b is followed by another station 4c for fastening the skins of the longitudinal fuselage portions, in turn followed by a station 4d for fastening the frames of the longitudinal fuselage portions.

Finally, the installation 1 ends with a station 4e for removing the assembled fuselage section, this station 4e being suitable for taking the section off the support structure.

Figure 2:
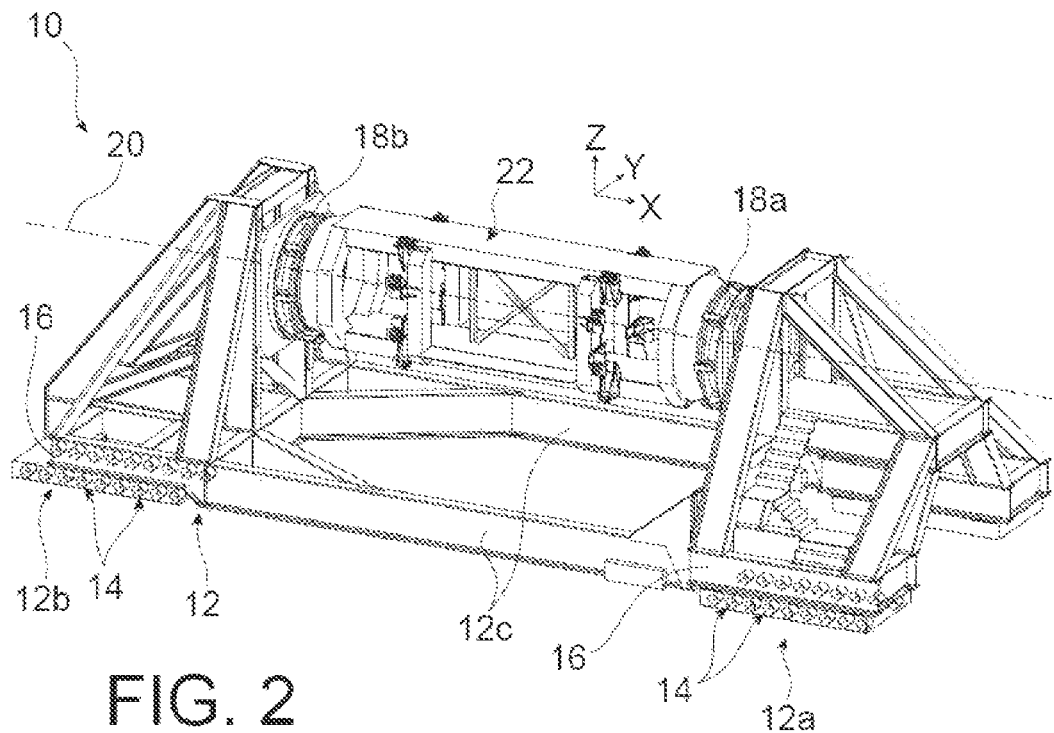
FIG. 2 is a perspective view of a structure for supporting a fuselage section, this support structure forming an integral part of the installation shown in the previous figure.
Figure 3:
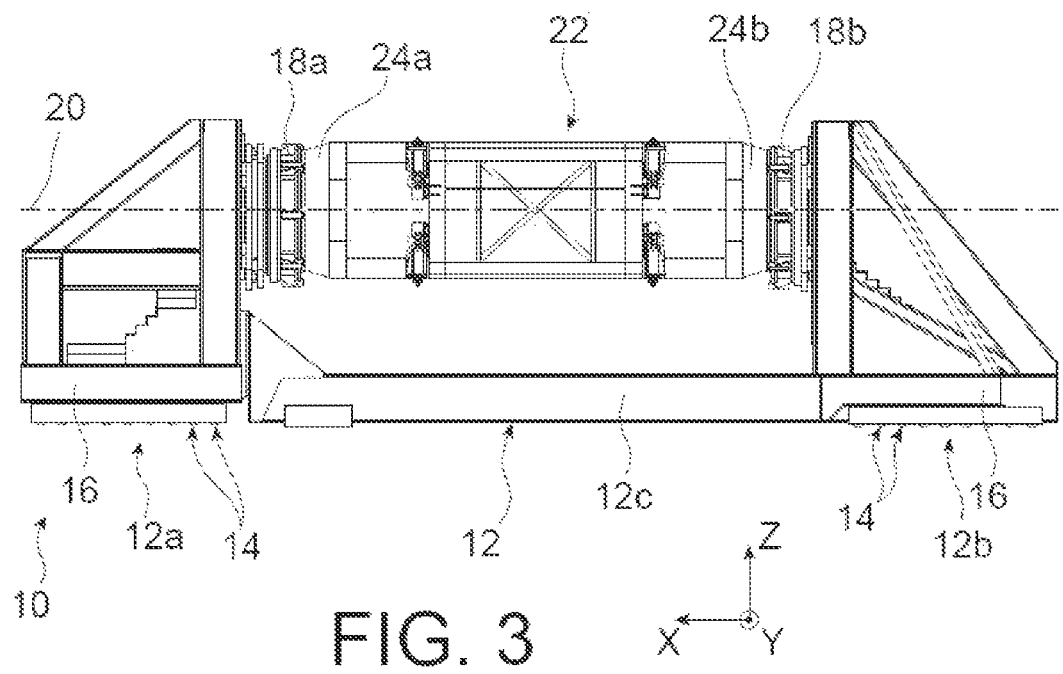
FIG. 3 is a side view of the support structure shown in the previous figure.

With reference to FIGS. 2 and 3, a preferred embodiment is shown of the support structure 10, which can be moved by rolling on the floor between the different stations of the installation. The support structure 10 has a longitudinal direction X, a transverse direction Y, and a vertical direction Z. These three directions X, Y and Z, which are orthogonal to each other, correspond respectively to the same longitudinal, transverse and vertical directions of the fuselage section to be assembled.

The support structure 10 firstly includes a chassis 12, formed using two chassis modules 12a, 12b arranged respectively at the two ends of the support structure 10, in the direction X. The chassis 12 also includes side members 12c spacing the two modules 12a, 12b apart from each other, still in the direction X.

The side members 12c are preferably rigidly connected to the module 12b, and removably connected at their opposite ends to the module 12a Alternatively, the side members 12c could be rigidly connected to the module 12a, and removably connected at their opposite ends to the module 12b.

Each of the two chassis modules 12a, 12b has a base 16 provided with one or more rolling elements, for example several motorized undercarriages 14, making it possible to move the support structure 10 by rolling on the floor of the installation. Alternatively, only the wheels associated with one of the two modules 12a, 12b could be drive wheels, with the wheels associated with the other module being follower wheels.

It will be noted that the rolling elements 14 can be replaced by any other movement element allowing the support structure 10 to move on the floor, such as sliding elements, for example of the air cushion type.

Moreover, on an upper portion of the structure 10, each of the two modules 12a, 12b includes a rotating support 18a, 18b, mounted so that it can rotate relative to the rest of the associated module, essentially produced by assembling beams and/or joists. The two rotating supports 18a, 18b respectively receive the two opposite longitudinal ends of a rotating core 22, forming an integral part of the support structure 10.

The core 22 is mounted so that it can rotate relative to the chassis 12 about an axis of rotation 20, parallel to the direction X and on which the two rotating supports 18a, 18b of the chassis modules 12a, 12b are centred. In this regard, it will be noted that one of the two rotating supports is a drive support, while the other is a follower support. The drive support is preferably the support 18b of the module 12b, while the follower support is preferably the support 18a of the chassis module 12a.

These two rotating supports 18a, 18b are preferably designed so that they have degrees of freedom of movement relative to the rest of the chassis in the directions X, and/or Y and/or Z, so that they are perfectly centred on the axis of rotation 20 of the core 22 to which these supports are coupled. By way of example, the drive rotating support 18b can have one degree of freedom of translation in the direction Z, while the follower rotating support 18a can have two degrees of freedom of translation in the directions Y and Z, or even another degree of freedom of translation in the direction X.

Figure 4:
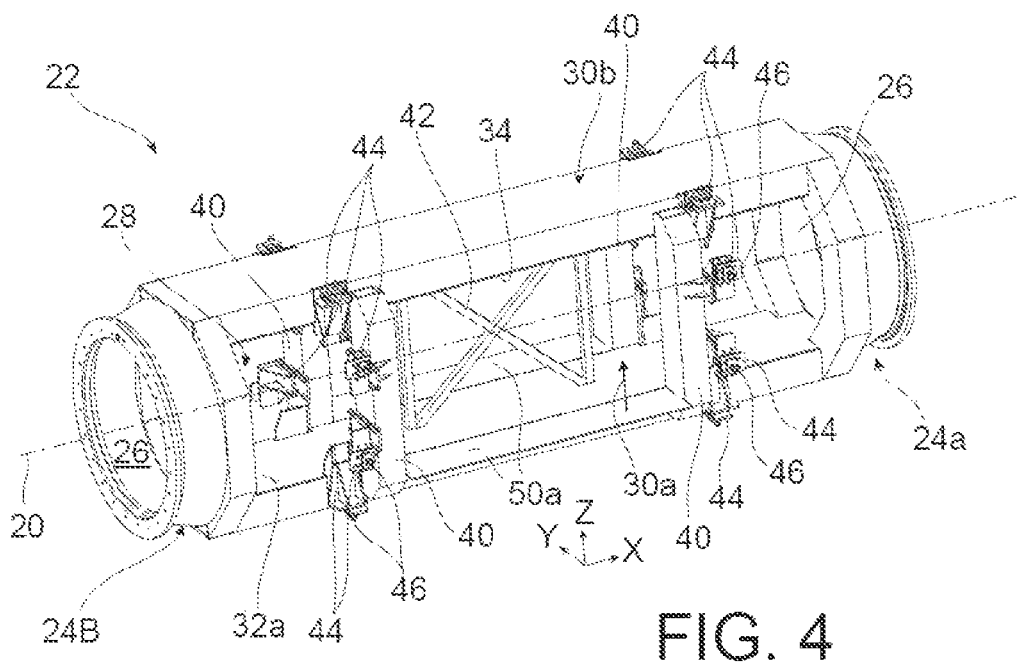
FIG. 4 is a more detailed perspective view of a rotating core provided on the support structure shown in FIGS. 2 and 3.
Figure 5:
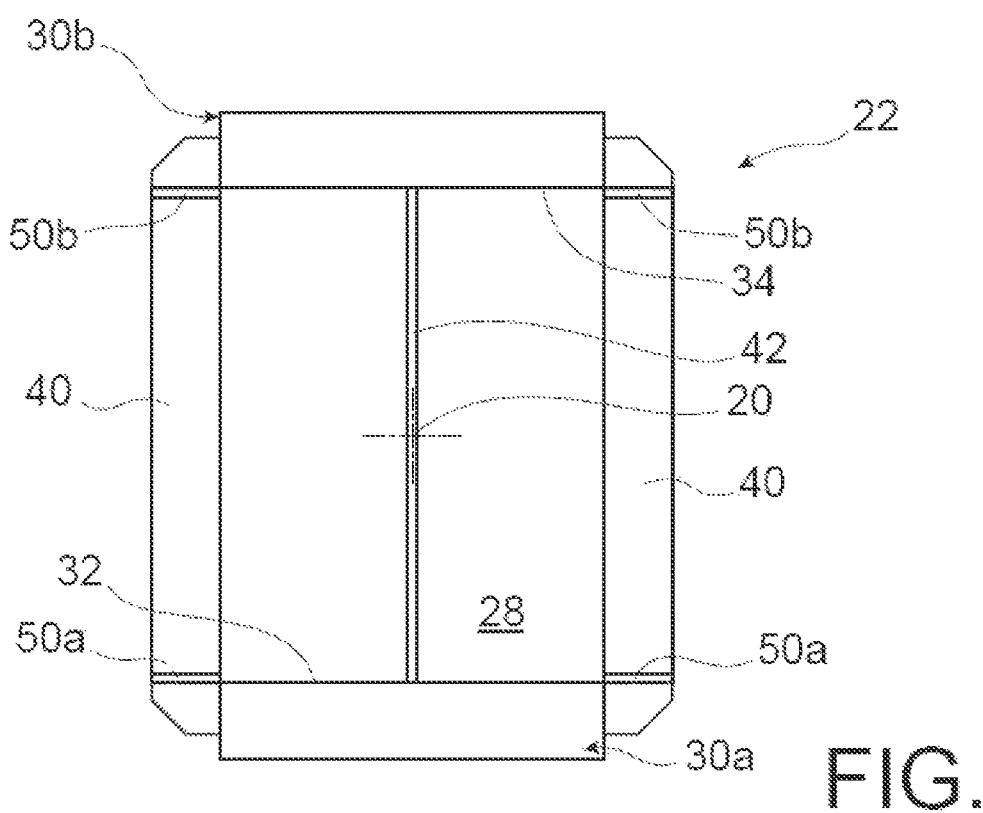
FIG. 5 is a schematic transverse cross-sectional view of the core shown in the previous figure.

FIGS. 4 and 5 show details of the design of the rotating core 22. At its longitudinal ends, it includes two opposite longitudinal end members 24a, 24b, preferably generally annular, centred on the axis of rotation 20. These two members 24a, 24b are the members suitable for being coupled to the two rotating supports 18a, 18b of the chassis respectively, for rotation therewith. Due to its generally annular shape, each longitudinal end member 24a, 24b defines a passageway 26 giving access to an inner space 28 of the core, in which operators can move around, and from which they can carry out operations on the section to be assembled.

The inner space 28 is not necessarily closed radially along its entire periphery. It is in particular radially delimited by a first longitudinal beam 30a extending in the direction X, and rigidly connecting the two end members 24a, 24b.

The first beam 30a, for example made in the form of a box, forms a first work platform allowing the operators to move around in the inner space 28. This first platform 30a can be used when one of its skins 32, arranged radially inwardly relative to the axis 20, is oriented horizontally upwards, as shown in FIGS. 4 and 5. In such a configuration, the skin in question 32 can be used as a walking surface/support for the operators wishing to move around/work inside the core.

In a diametrically opposite manner, the inner space 28 is also radially delimited by a second longitudinal beam 30b extending in the direction X, and rigidly connecting the two end members 24a, 24b. The second beam 30b, with an identical or similar design to the first beam 30a, forms a second work platform allowing the operators to move around in the inner space 28, when the core 22 is oriented differently from the angular position shown in FIGS. 4 and 5. This second platform 30b can be used when one of its skins 34, arranged radially inwardly relative to the axis 20, is oriented horizontally upwards, that is, with the core pivoted 180° relative to the position in FIGS. 4 and 5. In such a configuration, the skin in question 34 can be used as a walking surface/support for the operators wishing to move around/work inside the core 22.

The two work platforms 30a, 30b are therefore arranged axisymmetrically relative to the axis of rotation 20 of the core 22, by placing them radially facing each other, with a separation distance preferably greater than two metres. The two work platforms 30a, 30b advantageously make it possible to provide new areas of access to the fuselage section to be assembled, as these are no longer limited to areas outside this section. This facilitates the performance of certain operations, and limits the extent of the access areas to be provided outside the section at the stations affected by these operations suitable for being carried out from the inside of the core. This advantageously results in a reduction in the overall footprint of the installation, which is accompanied by the reduction already obtained due to the mobile character of the support structure 10 between the stations of this installation.

Obviously, the inner space 28 of the core can be used at several stations of the installation, as the support structure 10 moves between these stations.

The core 22 is structurally completed by other elements, for example beams or joists. These are for example reinforcing members 40 arranged on the periphery of the core 22, being arranged orthogonally to the two beams 30a, 30b, which they rigidly connect. There can also be an inner structure 42 separating the space 28 into two longitudinal inner half-shapes, the inner structure 42 also allowing the operators to support themselves when they are moving around inside the core 22.

Moreover, the core 22 is provided with fasteners for fastening the longitudinal fuselage portions. These fasteners 44, shown in FIG. 4, are designed to hold the longitudinal fuselage portions temporarily around the core 22, before and during the end-to-end fastening of their circumferential ends.

The fasteners are thus produced using several fasteners 44, at least some of which are rigidly borne by the first and second work platforms 30a, 30b. Other fasteners 44 are rigidly borne by the reinforcing members 40, or by both one of these members 40 and one of the platforms 30a, 30b.

The fasteners 44 each incorporate one or more degrees of freedom of movement relative to the structure of the core 22, for several reasons. The first reason lies in the possibility of adapting to longitudinal fuselage portions of different sizes and different shapes. The second reason lies in the ability of these fasteners 44 to retract, in order to allow the longitudinal removal of the section once it has been assembled around the core.

By way of illustration, each of these fasteners 44 has three degrees of freedom of translation in the directions X, Y and Z. Moreover, it will be noted that some of these fasteners 44 could be mounted on a support that is mobile relative to the structure of the core, in order to allow even greater adaptation to different fuselage shapes, for example circular, elliptical, oval, etc.

Preferably, the end of each of these fasteners 44 includes a fastening pin 46 suitable for interacting with complementary structures provided on the associated longitudinal fuselage portion, or on a support of this longitudinal portion. Alternatively, the longitudinal fuselage portion bears the fastening pin 46, and the fastener 44 then comprises the complementary structures for accommodating and holding the fastening pin. By way of example, the complementary structures can have a design that allows the pin to be held by balls (such as for example the system made by Jergens® known as the "Zero Point Mounting System").

With regard to the possibility of moving around and carrying out operations from the inside of the core 22, it will be noted that the core is preferably provided with additional work platforms that supplement the first and second platforms 30a, 30b already described above. These are platforms that make it possible to facilitate peripheral access to the longitudinal fuselage portions.

These are firstly two first additional work platforms 50a, respectively arranged laterally on either side of the first platform 30a, parallel thereto. The two first additional platforms 50a preferably extend over the entire length between the reinforcing members 40, on which they are mounted so that they are height-adjustable relative to the first platform 30a.

Figure 6:
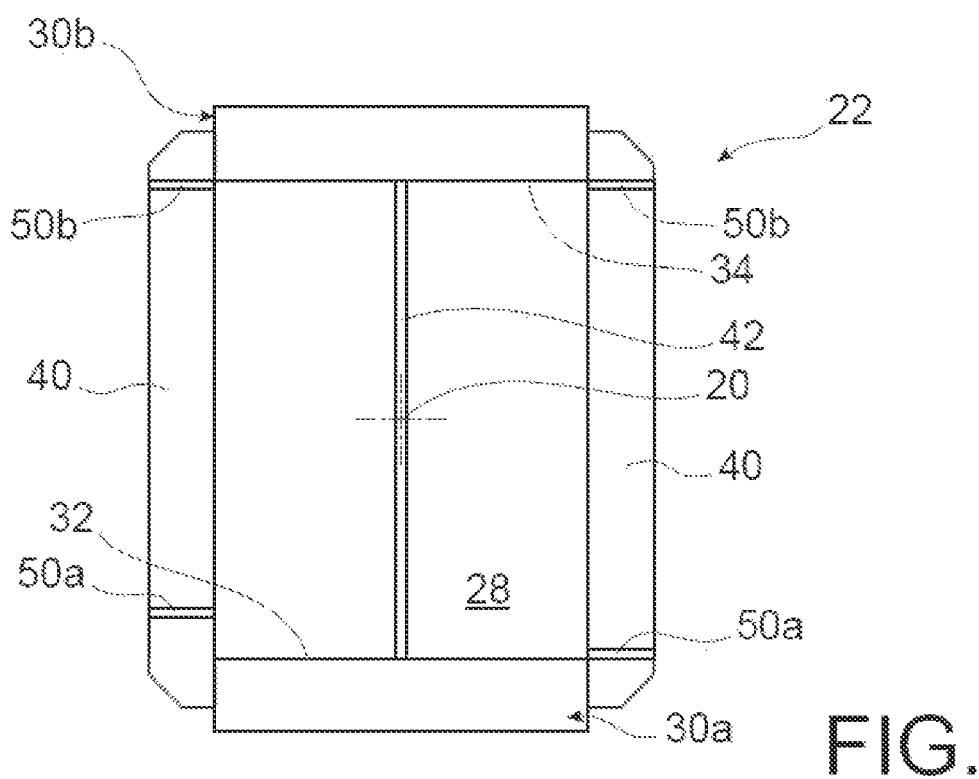
FIG. 6 is a schematic transverse cross-sectional view similar to the view in the previous figure, with the core in another work configuration.

In FIGS. 4 and 5, the two first additional work platforms 50a are substantially in the same plane as the skin 32 of the first platform 30a, in order to form a single platform on which the operators can move around, and carry out operations on the longitudinal fuselage portions held around the core 22. FIG. 6 shows another configuration, in which the first additional platform 50a is substantially raised relative to the skin 32, so that it can be better adapted to the requirements and size of the operator. Each first additional platform 50a can thus be individually height-adjusted, to give the operators the best possible working conditions.

Figure 7:
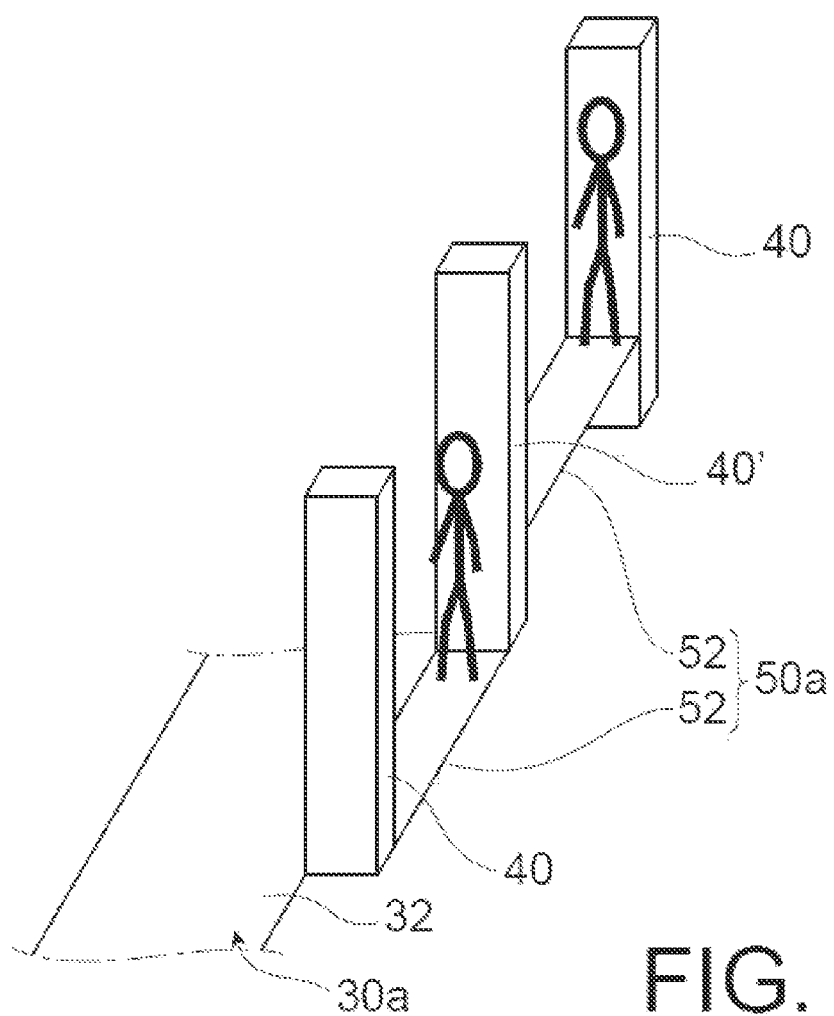
FIG. 7 is a schematic perspective view of a first additional work platform provided on the core shown in the previous figures, with this first additional work platform in an alternative embodiment.

Furthermore, FIG. 7 shows an alternative embodiment in which each first additional work platform 50a is produced from several longitudinal segments 52 that succeed each other in the direction X. In this case, two segments 52 succeed each other, each being mounted on an intermediate reinforcing member 40', arranged between the two reinforcing members 40 on which these two longitudinal segments 52 are also mounted.

The adjustment of the height of each of these segments 52 can be independent, so that it can be adapted to the size and task of each operator located on the same side of the core 22.

An identical or similar design is provided in association with the second work platform 30b, through two second additional work platforms 50b respectively arranged laterally on either side of the second platform 30b, parallel thereto. It will be noted that when the first platform 30a is active and the second platform 30b is inactive, as can be seen in FIG. 6, the two second additional work platforms 50b are retracted or arranged in their end position in order to avoid hindering the operators located on the platforms 30a, 50a.

The same applies to the two first additional work platforms 50a, when the first platform 30a is inactive and the second platform 30b is active.

A method for assembling an aircraft fuselage section according to a preferred embodiment of the disclosure herein will now be described, this method being carried out on the installation 1 including the support structure 10 described in detail above.

Figure 8:
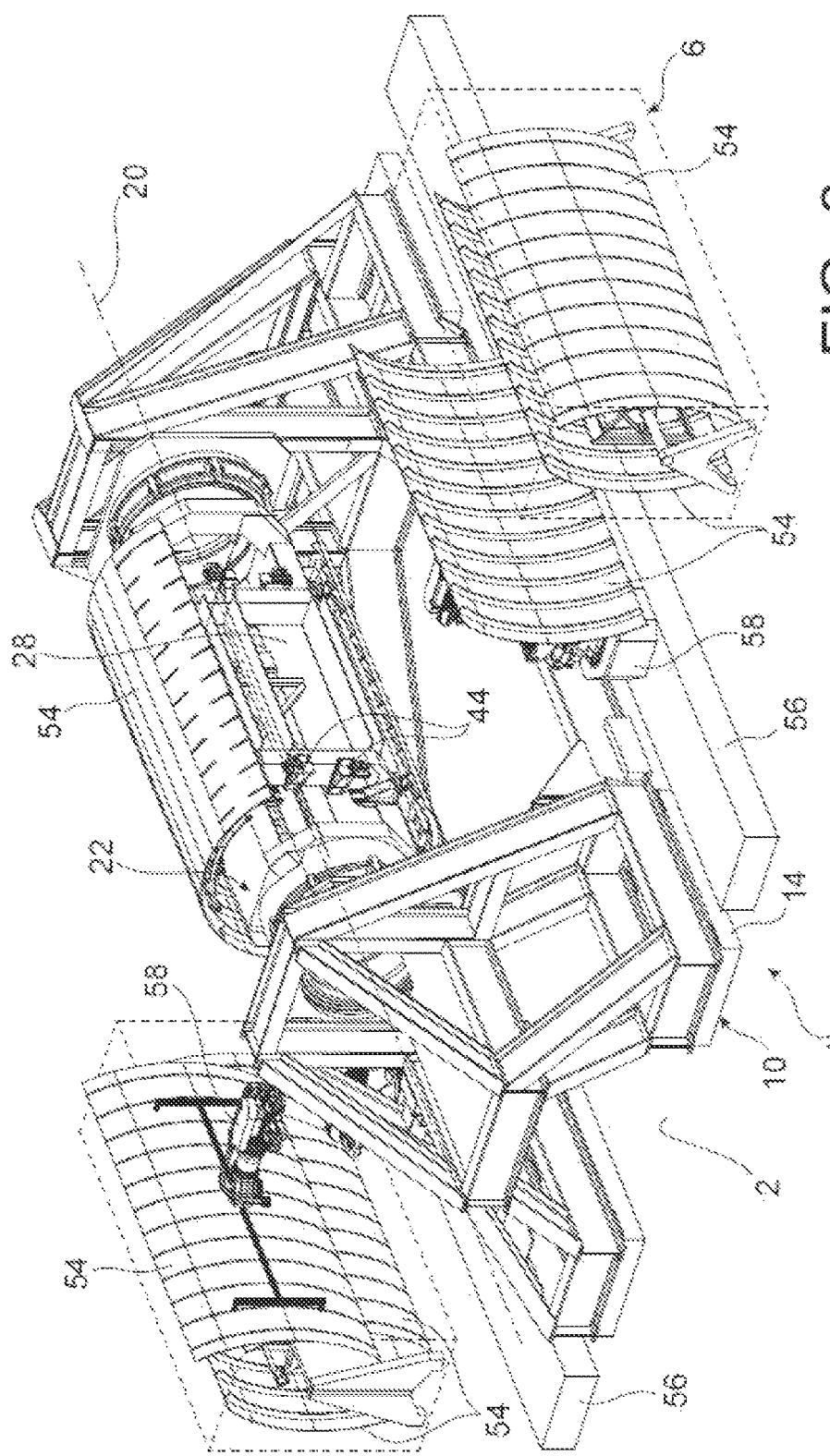
FIG. 8 is a perspective view schematically showing a first step of a method for assembling a fuselage section, according to a preferred embodiment of the disclosure herein.

FIG. 8 shows a first step of the method, carried out within the loading station 4b. This first step consists of or comprises loading the longitudinal fuselage portions 54 onto the core 22 of the mobile support structure 10, which in this case has been moved to the loading station 4b. To this end, containers 6 containing the longitudinal fuselage portions 54 are first conveyed from the storage station 4a to the loading station 4b. The movement of the containers 6 on the floor 2 is automated, as is the movement of the support structure 10 between the different stations of the installation.

The containers 6 are placed near two work ramps 56 of the station 4b, between which the support structure 10 is parked. Each work ramp 56 includes a robot 58 that slides longitudinally and is provided at its end with a member for gripping the longitudinal fuselage portions 54. In operation, the robot 58 grips one of the longitudinal fuselage portions 54 accommodated in one of the containers 6, then mounts it laterally on the core 22 using the fasteners 44. To interact therewith, the longitudinal fuselage portion 54 held by the robot 58 includes the aforementioned complementary structures (not shown) suitable for interacting with the pins of the fasteners 44. The fasteners 44 and their complementary structures preferably have designs that allow the automatic centring thereof, when the pin is inserted into the complementary structures suitable for locking the pin.

When two longitudinal fuselage portions 54 have been mounted laterally diametrically opposite each other on the core 22, from the two work ramps 56 respectively, the core is pivoted 180° about its axis 20 so that the same operations can be repeated, with two other portions 54 that can also be mounted simultaneously on the core. The as-yet unassembled fuselage section is then made up of four longitudinal fuselage portions 54, arranged end-to-end in the circumferential direction, around the core 22. Preferably, each of these portions 54 extends over an angular sector of approximately 90°. Alternatively, two portions 54 could extend over a substantially identical angular sector greater than 90°, while the other two portions 54 could extend over a substantially identical angular sector less than 90°. The number of longitudinal fuselage portions 54 could also differ, although the solution with four portions 54 is preferred.

During this first step, operators can be supported and move around in the inner space 28 of the core, in order to perform operations to monitor the correct fitting of the longitudinal fuselage portions 54 onto the fasteners 44 of the core 22. These operations performed by the operators from the inside of the core are carried out from the first platform 30a and/or from the first additional platforms 50a when they are oriented horizontally upwards or, alternatively, from the second platform 30b and/or from the second additional platforms 50b when they are oriented horizontally upwards.

Figure 9:
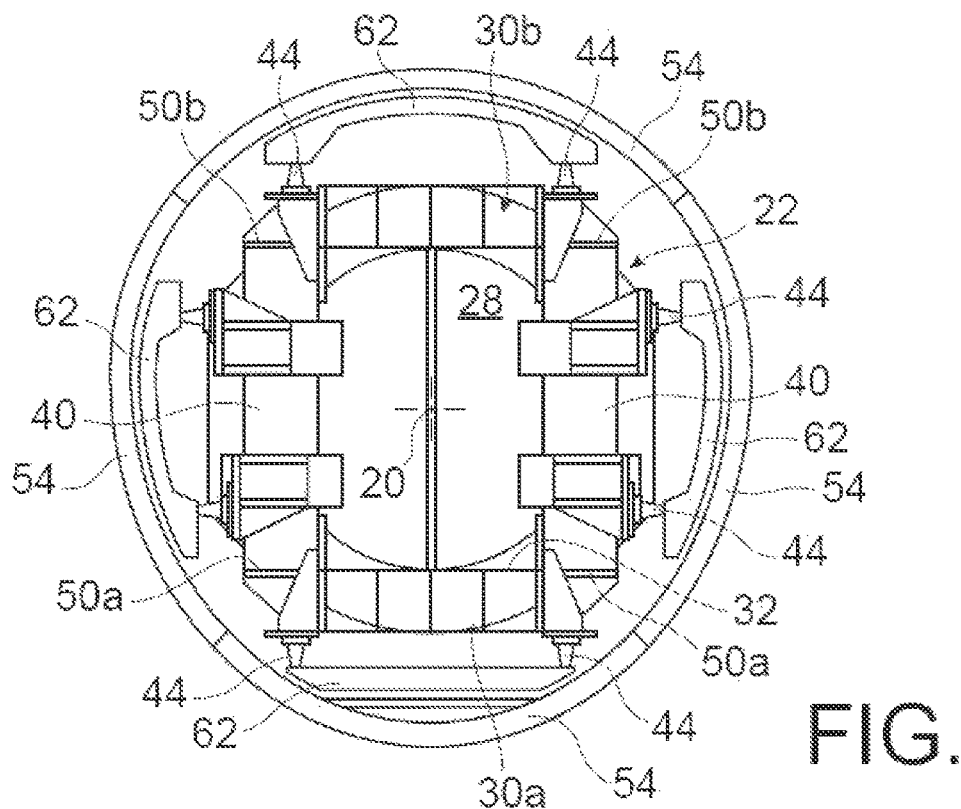
FIG. 9 is a transverse cross-sectional view of the core around which are mounted longitudinal fuselage portions, in a configuration as obtained following the carrying out of the first step of the method, for obtaining a section with a substantially circular cross-section.
Figure 10:
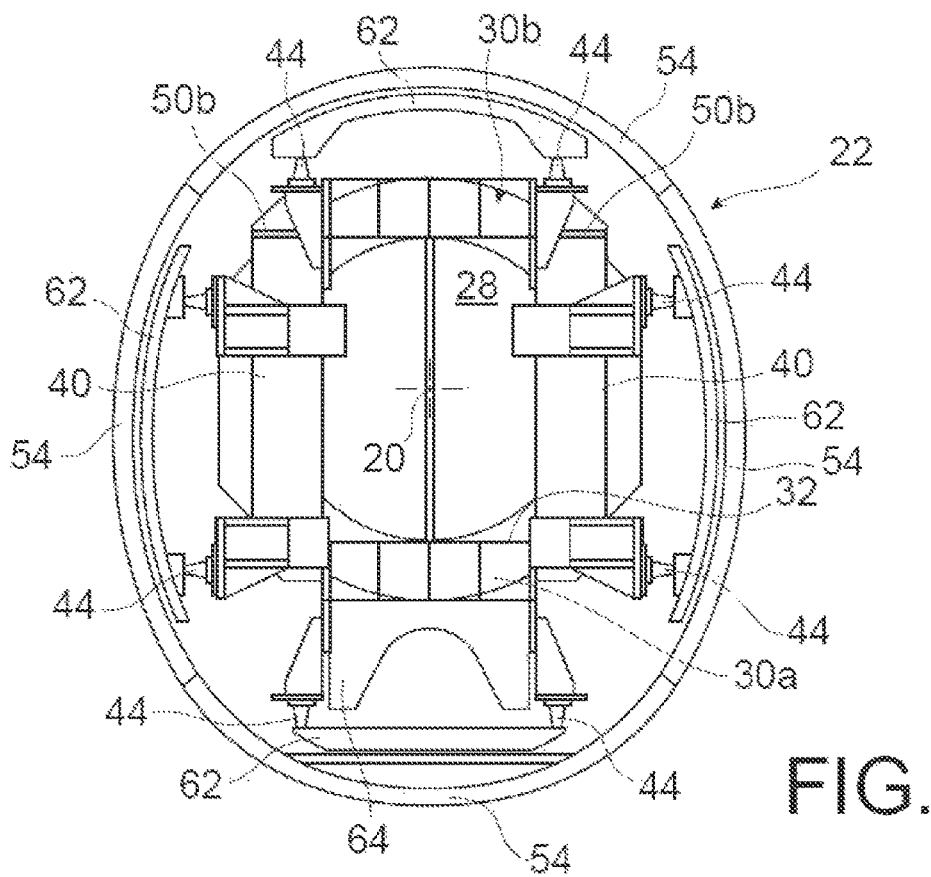
FIG. 10 is a transverse cross-sectional view similar to the view in the previous figure, showing longitudinal fuselage portions for obtaining a section with a substantially elliptical cross-section.

FIG. 9 shows the as-yet unassembled fuselage section, formed by the four longitudinal fuselage portions 54 arranged end-to-end in the circumferential direction, around the core 22. In this configuration, each portion 54 is provided internally with its support 62, which forms the interface with the fasteners 44 of the core. In this case, the section to be obtained has a substantially circular transverse cross-section. Alternatively, in the embodiment shown in FIG. 10, the transverse cross-section is substantially elliptical. As mentioned previously, this arrangement can be obtained by moving a mobile support 64 of the core 22. This mobile support 64 bears at least two lower fasteners 44 which, when they are moved downwards with this support 64 relative to the rest of the core 22, allow the core to receive a fuselage section having a more elongated shape in the vertical direction.

Figure 11:
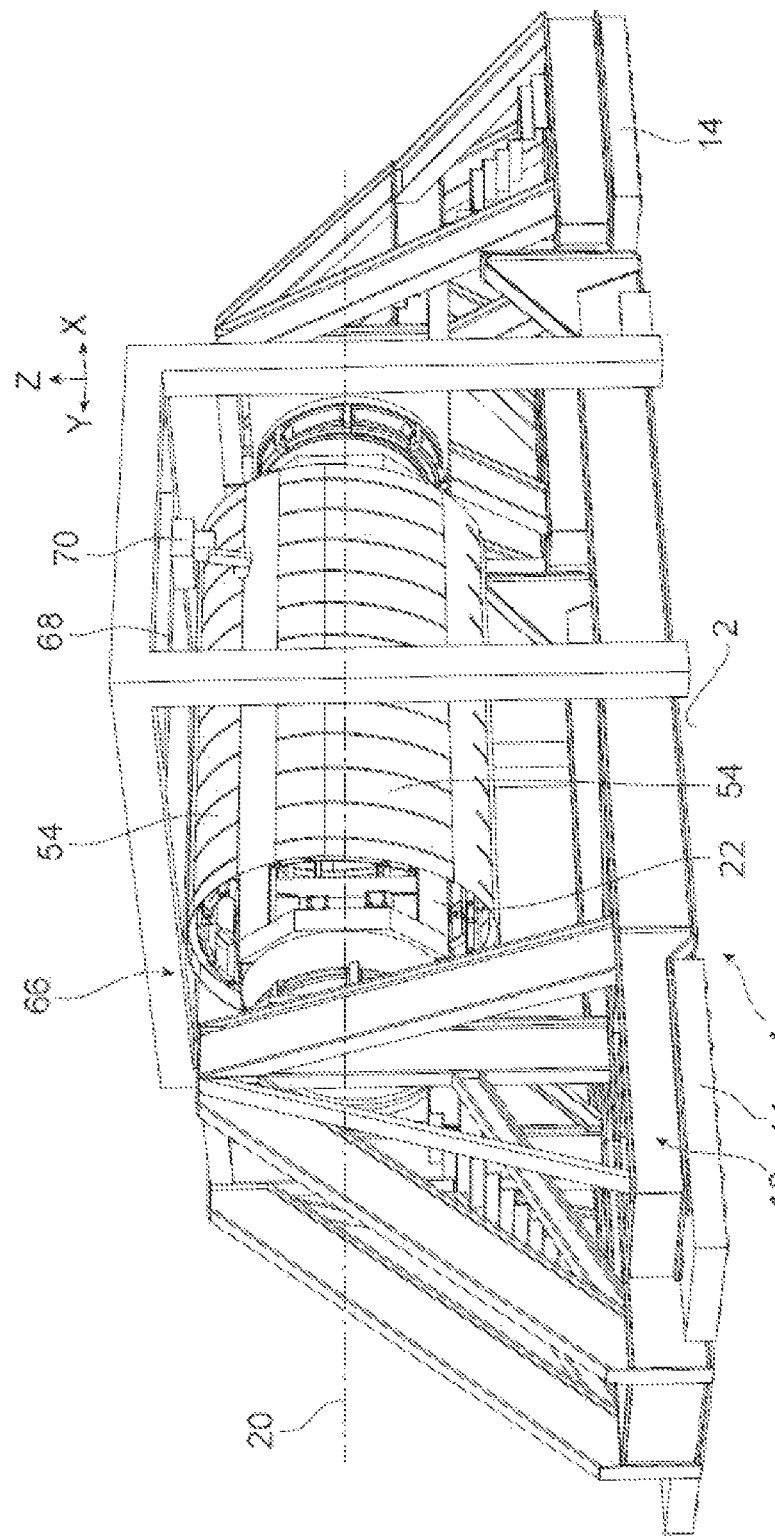
FIG. 11 is a perspective view showing a second step of the method for assembling the fuselage section.
Figure 12:
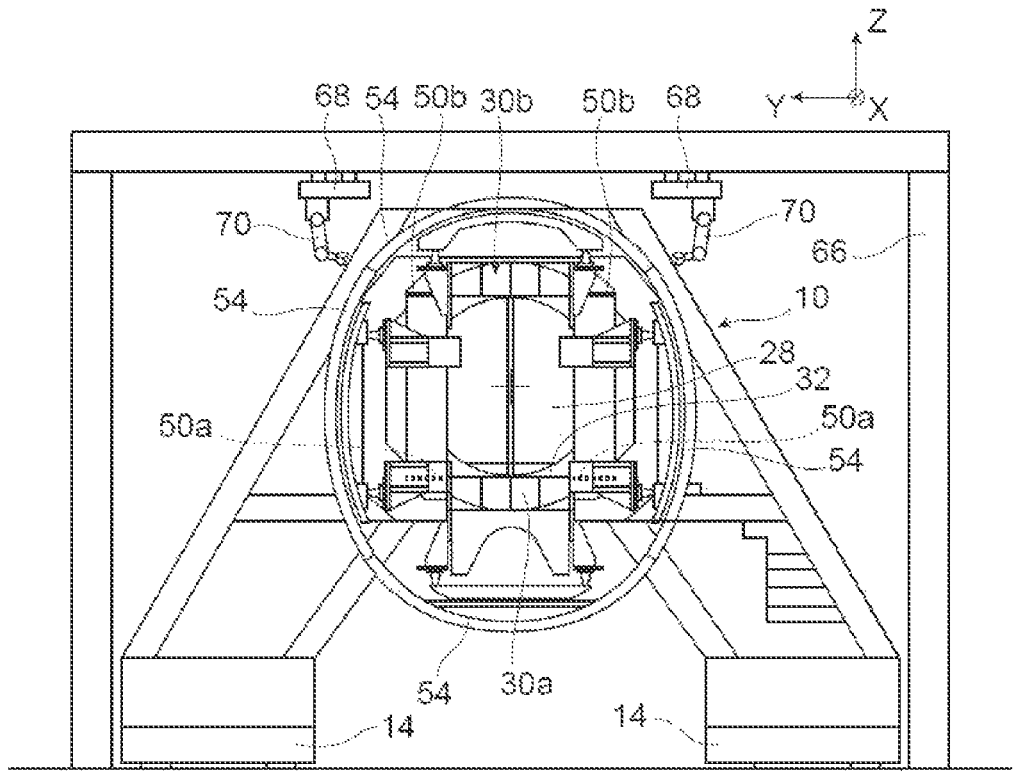
FIG. 12 is a transverse cross-sectional view of the station shown in the previous figure.

FIGS. 11 and 12 show a second step of the method, carried out within the station 4c for fastening the skins of the longitudinal fuselage portions 54. To this end, the support structure 10 is moved to the station 4c by rolling on the floor 2, until it is accommodated under a fixed gantry 66 of the station 4c. The gantry 66 is provided with two longitudinal ramps 68 each holding a robot 70 that slides longitudinally on its associated ramp, for example in the form of a rail. Each robot 70 is a fastening tool designed to produce a longitudinal fastening joint at the interface between the skins of two longitudinal fuselage portions 54 adjacent to each other in the circumferential direction. This joint is produced for example by a continuous weld or by a plurality of tack welds, from the outside of the longitudinal fuselage portions 54. Each robot 70 is also capable of producing holes/bores, as well as fitting elements for fastening together the two fuselage portions 54. As a result, with the two robots 70, both of the interfaces at the top of the as-yet unassembled section can be handled simultaneously.

The core is then pivoted 180° about the axis 20, so that the other two interfaces between the portions 54 can be handled, which are in turn arranged at the top of the section, near the robots 70.

During this second step, operators can be supported and move around in the inner space 28 of the core, in order to perform operations to monitor the skin joints made at the interfaces between the longitudinal fuselage portions 54. These operations performed by the operators from the inside of the core are carried out from the first platform 30a and/or from the first additional platforms 50a when they are oriented horizontally upwards or, alternatively, from the second platform 30b and/or from the second additional platforms 50b when they are oriented horizontally upwards.

Figure 13:
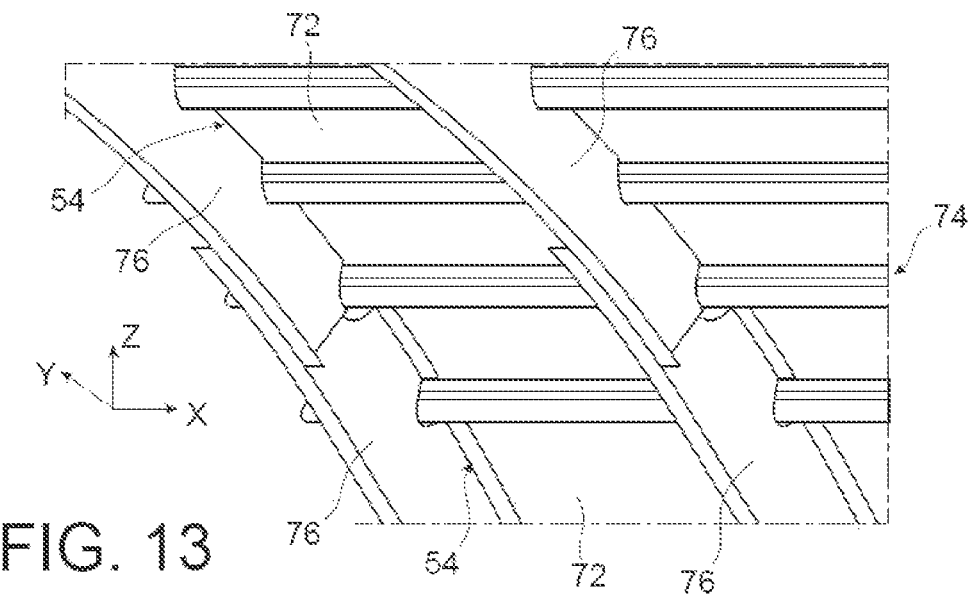
FIG. 13 is a perspective view of two longitudinal fuselage portions, during the assembly thereof.

FIG. 13 shows two adjacent longitudinal fuselage portions 54. The purpose of the second step described above is to produce a longitudinal joint between the two skins 72, at the interface 74 between the two portions 54.

The purpose of the third step is to fasten the frames 76 of the two adjacent portions 54, again at the interfaces 74 between these portions 54. This third step is described with reference to FIGS. 14 and 15. It has the specific feature of being performed from the inside of the core 22, in the inner space 28 in which the operators can move around and be supported. The operators can operate fastening tools (not shown), to fasten the frames 76 two by two at the two highest interfaces 74 between the longitudinal fuselage portions 54.

Once these operations have been carried out, the core 22 is pivoted 180° about the axis 20, so that the other two interfaces 74 between the portions 54 can be handled, which are in turn arranged at the top of the section, easily accessible to the operators situated inside the core 22.

During this third step, operators can be supported and move around in the inner space 28 of the core, in order to perform the operations to fasten the frames 76. These operations are performed from the first platform 30a and/or from the first additional platforms 50a when they are oriented horizontally upwards or, alternatively, from the second platform 30b and/or from the second additional platforms 50b when they are oriented horizontally upwards.

Figure 14:
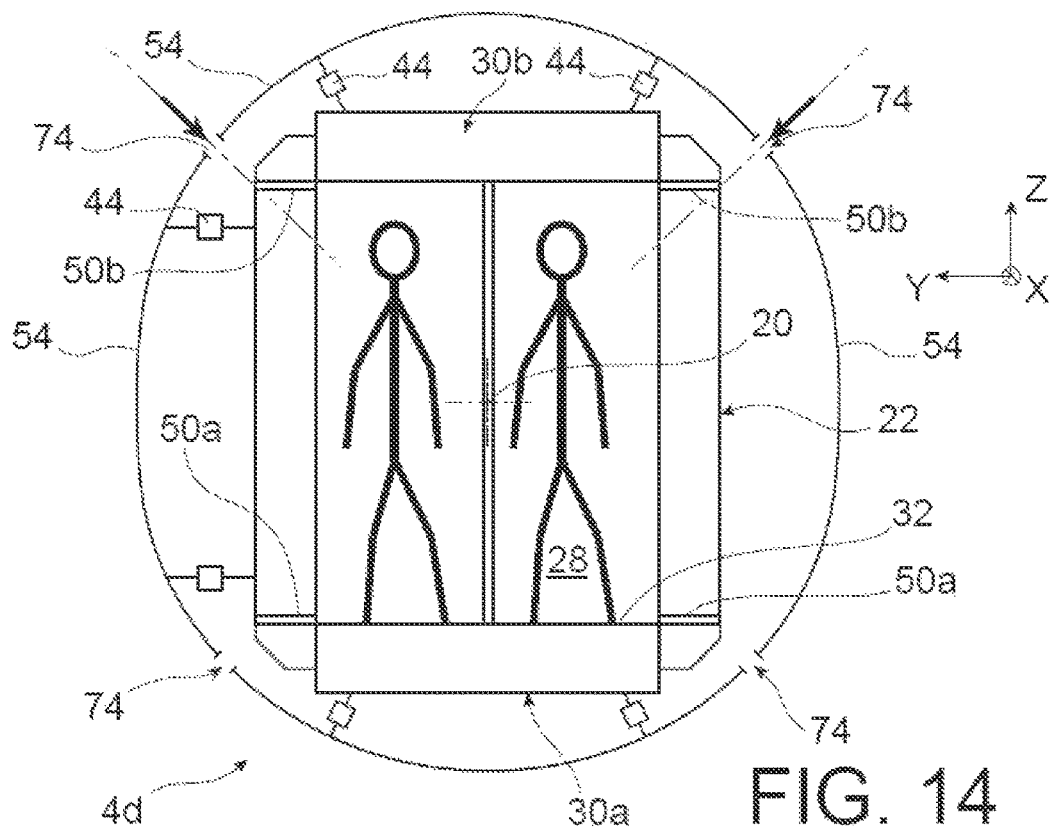
FIG. 14 is a transverse cross-sectional view of a station for carrying out a third step of the assembly method.
Figure 15:
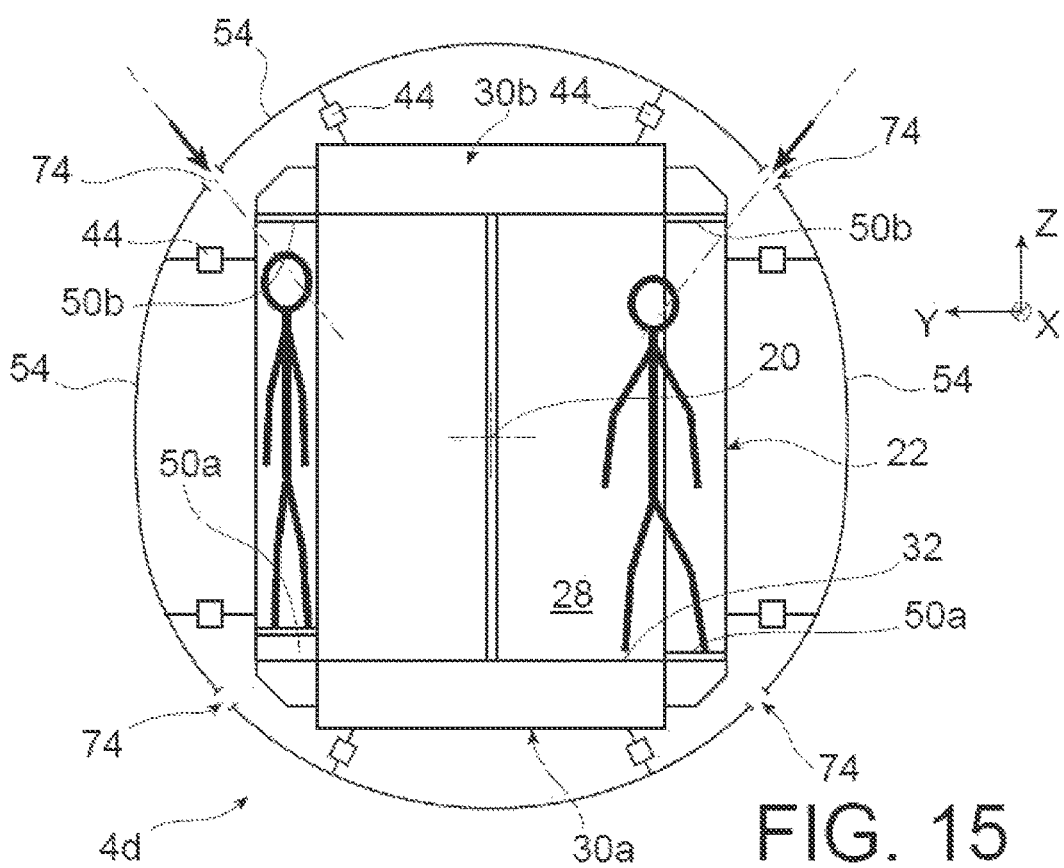
FIG. 15 is a schematic transverse cross-sectional view similar to the view in the previous figure, with the core in another work configuration.
Figure 16:
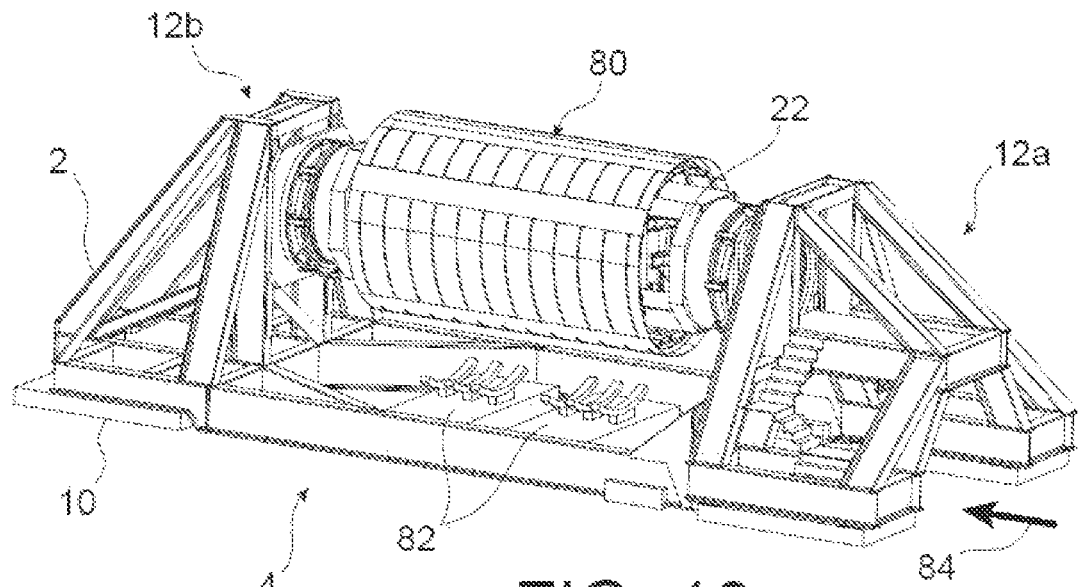
FIG. 16 is a perspective view of the support structure, in a state as adopted during a fourth step of the method, with the aim of removing the fuselage section from the core.

During this third step, as for the other steps of the method, the height of the additional platforms 50a, 50b can be adjusted depending on the size of the operators, so that they can work easily at the interfaces 74 arranged at the top of the section being assembled. FIG. 14 thus shows coplanar or substantially coplanar platforms 30a, 50a, while in another possible configuration shown in FIG. 15, at least one of the additional first platforms 50a is raised so that it is adapted to a smaller operator.

FIGS. 16 through 19 show a fourth step of the method, the purpose of which is to remove the fuselage section from the core 22. This step is carried out within station 4e, and starts with the insertion under the assembled fuselage section 80 of mobile supports 82 for supporting and conveying the section. These mobile supports 82 are inserted under the section 80 and the core 22, rolling on the floor 2 and passing through an opening in the chassis module 12a, as shown by the arrow 84 in FIG. 16. Alternatively, these mobile supports 82 could slide on the floor, for example via air cushions.

At this stage, the mobile supports 82 are raised so that they come into contact with the outer surface of the fuselage section 80, following which the fasteners 44 on the core 22 are retracted radially to break the connection with the section, or with the supports 62 of the longitudinal fuselage portions forming this section. Alternatively, when such supports 62 form the interface between the core 22 and the longitudinal fuselage portions 54, the connections between the supports 62 and these portions 54 can be broken, before the longitudinal rem oval of the fuselage section.

Figure 17:
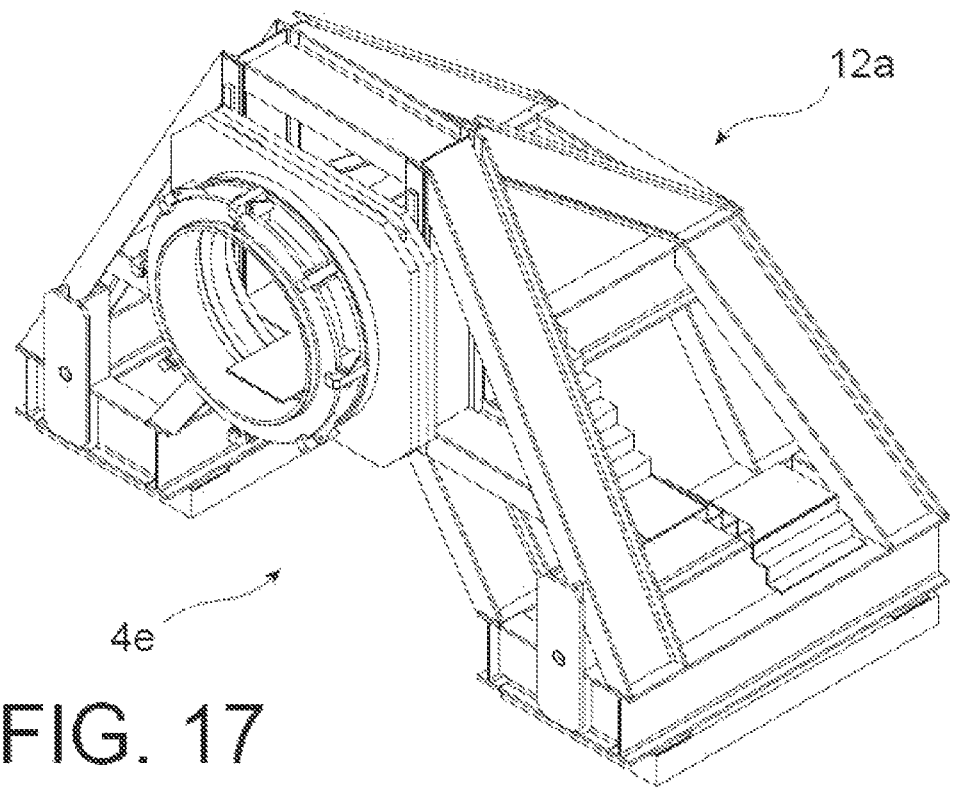
FIG. 17 is a perspective view of a portion of the support structure, during the fourth step of the method.
Figure 18:
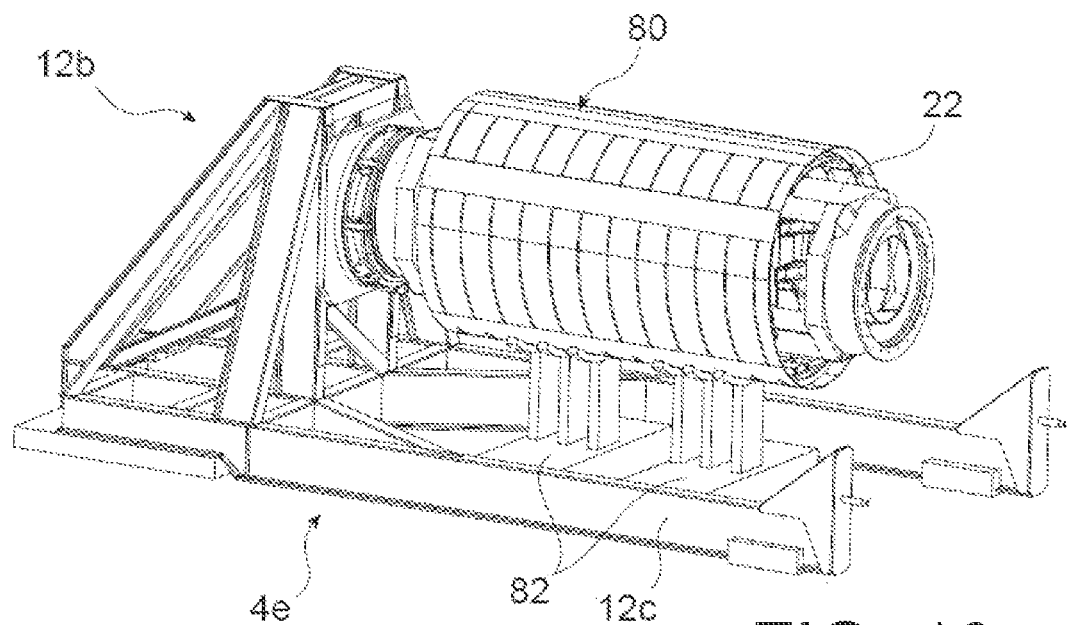
FIG. 18 is a perspective view of another portion of the support structure, during the fourth step of the method.

Next, the two portions of the chassis of the support structure 10 are uncoupled and separated, in order to obtain the chassis module 12a shown in FIG. 17, and the chassis module 12b bearing the core 22 surrounded by the fuselage section 80, as shown in FIG. 18.

Figure 19:
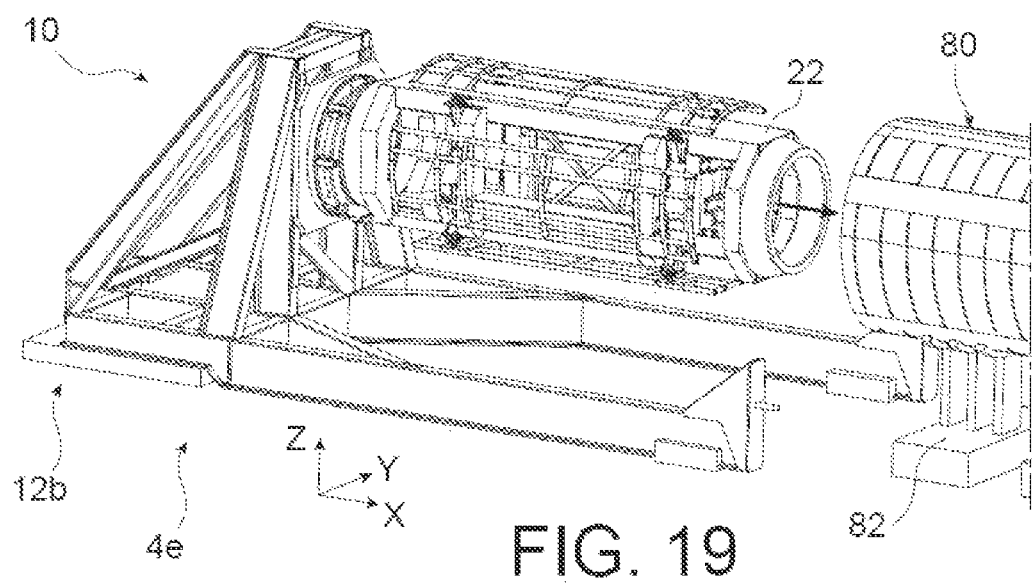
FIG. 19 is a perspective view of the portion of the support structure shown in the previous figure, after the removal of the fuselage section.

Finally, still within the unloading station 4e, the mobile supports 82 are moved longitudinally in order to take with them the section 80, which is then gradually removed from the core 22 in the direction X, as shown in FIG. 19.

When the removal of the fuselage section 80 is finished, the chassis module 12a is coupled to the rest of the chassis again, so that the integrity of the support structure 10 is restored. It can then be moved to the start of the assembly line, to carry out the method for assembling another section.

It will be noted that in the configuration in FIG. 19, the chassis 12 minus its module 12a has a design perfectly suited to forming a fuselage nose, according to steps of a method that are identical or similar to those described above.

It will be recalled that the inner space 28 of the core, in which the operators can move around and be supported during one or more of the steps of the assembly method, is a preferred, but not essential, feature of the disclosure herein. Other embodiments can thus be envisaged without this inner space 28 for moving around in the core, such as for example the embodiment shown in FIGS. 20 to 22.

Figure 20:
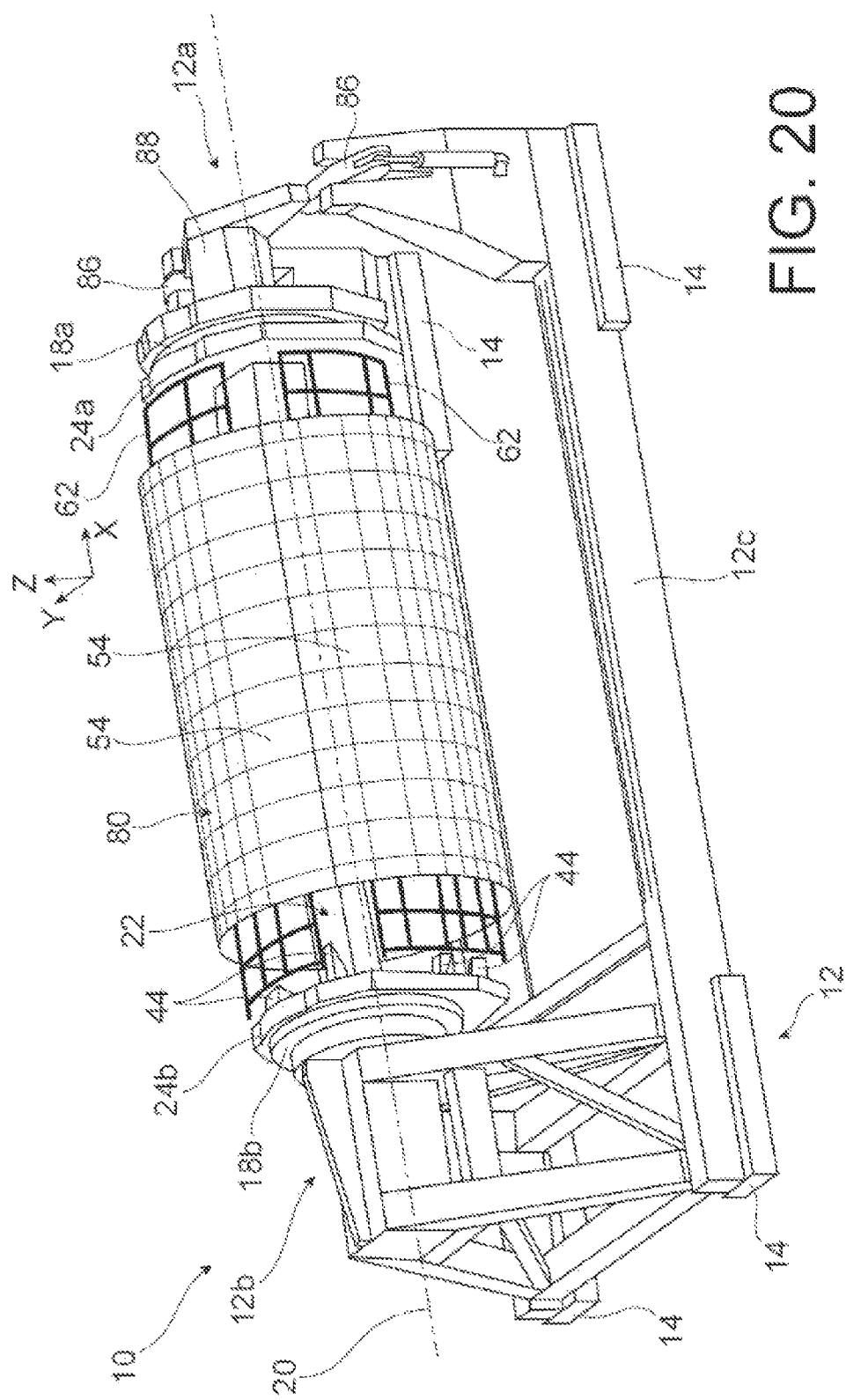
FIG. 20 is a perspective view of a structure for supporting a fuselage section, according to another preferred embodiment of the disclosure herein, the rotating core of the support structure being surrounded by the longitudinal fuselage portions for forming the section.
Figure 21:
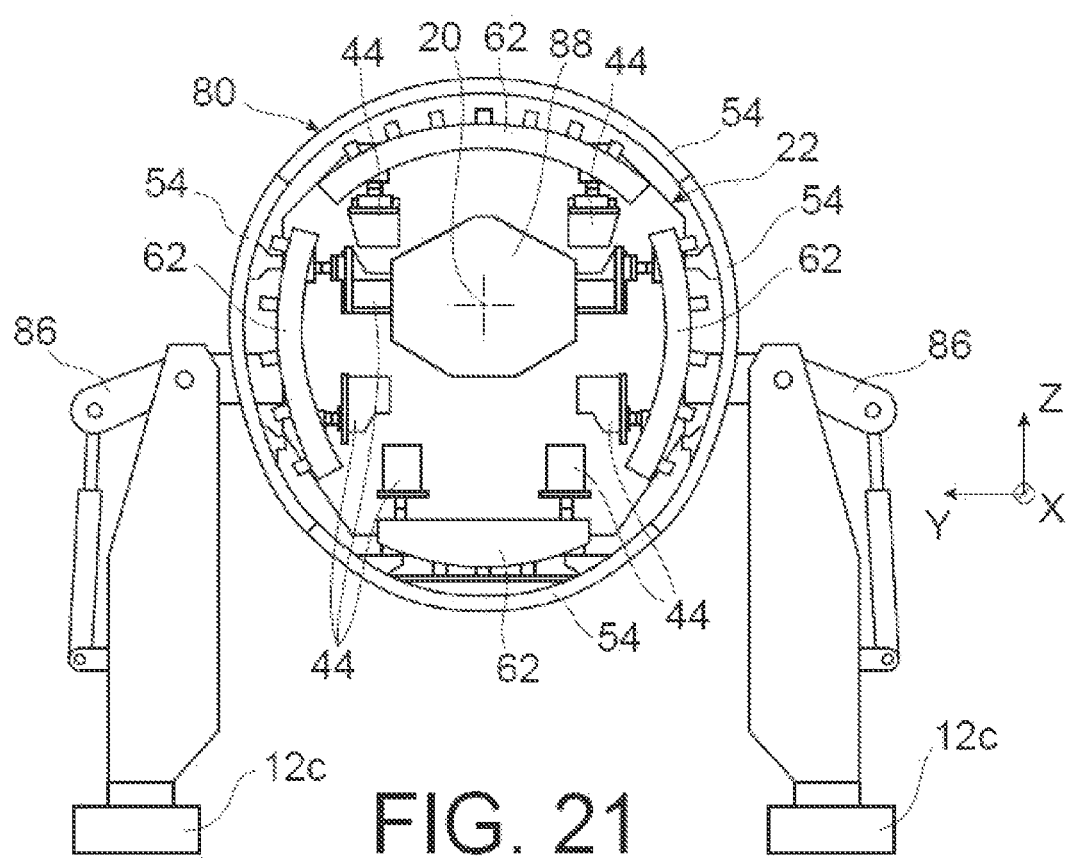
FIG. 21 is a transverse cross-sectional view of the support structure shown in the previous figure.
Figure 22:
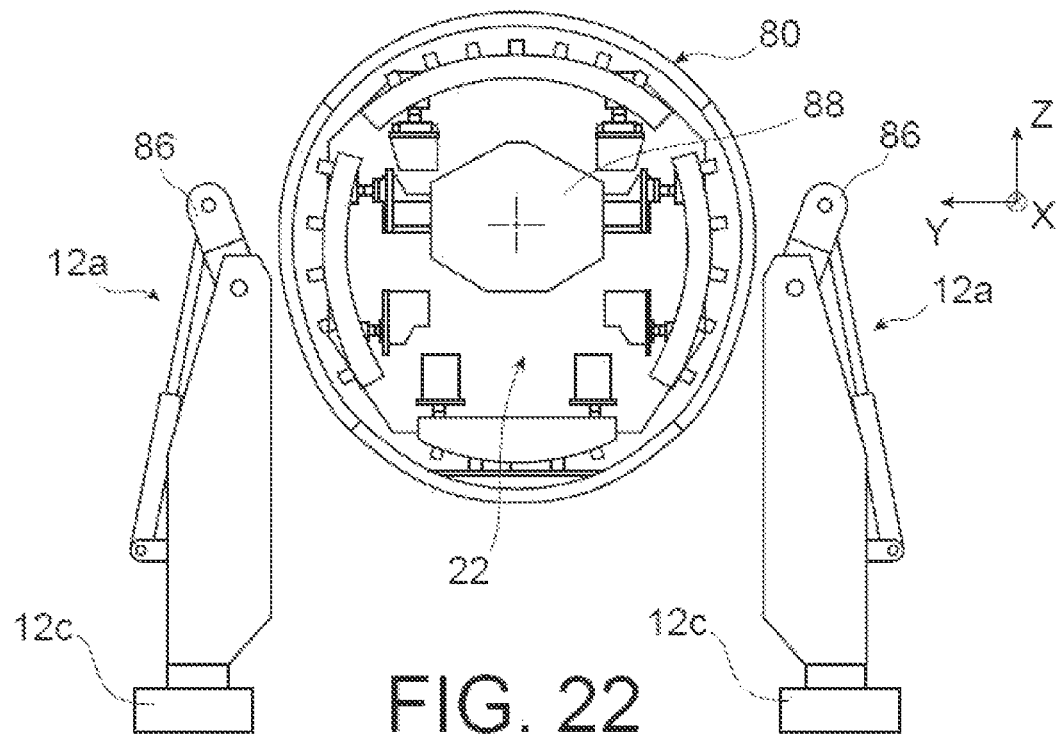
FIG. 22 is a transverse cross-sectional view similar to the view in the previous figure, with the support structure in another configuration.

In FIGS. 20 through 22, not only does the core 22 not have an inner space for moving around, but another difference also lies in the chassis 12, and more specifically in the chassis module 12a. The latter includes retractable rods 86 which, in their support position shown in FIGS. 20 and 21, make it possible to support a fixed central beam 88 of the core 22.

Conversely, in the retracted position of the rods 86 shown in FIG. 22, the central beam 88 is cantilevered, and the fuselage section 80 can thus be removed longitudinally from the core 22.

Of course, a person skilled in the art could make various modifications to the disclosure herein described above, solely by way of non-limiting examples that can be combined, and the scope of which is defined by the following claims.

While at least one example embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A support structure for assembling a fuselage section, the support structure comprising a chassis;
one or more movement elements on the chassis,
wherein the one or more movement elements is configured to allow movement of the support structure;
a core, which is mounted to rotate relative to the chassis about an axis of rotation of the core and comprises fasteners for holding longitudinal fuselage portions around the core,
with a view to assembling the longitudinal fuselage portions together to form the fuselage section;
a first work platform,
which is incorporated into the core and is configured to allow operators to move around inside the core to carry out operations on the
fuselage section being assembled when the first work platform is in an angular position,
in which the first work platform is oriented horizontally upwards;
a second work platform,
which is incorporated into the core and is configured to allow operators to move around inside the core to carry out operations on the fuselage section being assembled when the second work platform is oriented horizontally upwards,
which occurs the core is oriented differently from the angular position in which the first work platform is oriented horizontally upwards.

2. The support structure according to claim 1, wherein the first and second work platforms are arranged facing each other, and axisymmetrically relative to the axis of rotation of the core.

3. The support structure according to claim 1, wherein the core comprises two end members, which are longitudinally spaced apart from each other, on opposite ends of the core, and at least one longitudinal beam, which connects the two end members together to form the first work platform.

4. The support structure according to claim 3, wherein at least one of the two end members has a passageway, through which the first work platform is accessible inside the core.

5. The support structure according to claim 3, wherein the core comprises at least two second additional work platforms, each of which is arranged parallel to the second work platform and is height-adjustable relative to the second work platform, wherein the at least two second additional work platforms are arranged on opposite lateral sides of the second work platform from each other.

6. The support structure according to claim 1, wherein the core comprises two end members, which are longitudinally spaced apart from each other, on opposite ends of the core, and at least two longitudinal beams, each of which connects the two end members together, such that a first longitudinal beam of the at least two longitudinal beams forms the first work platform and a second longitudinal beam of the at least two longitudinal beams forms the second work platform.

7. The support structure according to claim 1, wherein the core comprises at least two first additional work platforms, each of which is arranged parallel to the first work platform and is height-adjustable relative to the first work platform, wherein the at least two first additional work platforms are arranged on opposite lateral sides of the first work platform from each other.

8. The support structure according to claim 7, wherein one or more of the at least two first additional work platforms comprises a plurality of longitudinal segments that are arranged successively along the core, one after another, each of the plurality of longitudinal segments being height-adjustable independently of others of the plurality of longitudinal segments.

9. The support structure according to claim 7, wherein the core comprises at least two second additional work platforms, each of which is arranged parallel to the second work platform and is height-adjustable relative to the second work platform, wherein the at least two second additional work platforms are arranged on opposite lateral sides of the second work platform from each other.

10. The support structure according to claim 1, wherein at least some of the fasteners are provided on the first work platform.

11. The support structure according to claim 1, wherein the chassis comprises two chassis modules spaced apart from each other about the axis of rotation of the core, each of the two chassis modules comprising a rotating support, which receives a longitudinal core end, and one or more rolling elements, which are configured to allow movement of the support structure.

12. An installation for assembling a fuselage portion comprising a plurality of stations, together with a support structure according to claim 1, wherein the support structure is mobile between the plurality of stations.

13. The support structure according to claim 1, wherein the core comprises:
two end members, which are longitudinally spaced apart from each other, on opposite ends of the core;
at least two longitudinal beams, each of which connects the two end members together, such that a first longitudinal beam of the at least two longitudinal beams forms the first work platform and a second longitudinal beam of the at least two longitudinal beams forms the second work platform;
at least two first additional work platforms, each of which is arranged parallel to the first work platform and is height-adjustable relative to the first work platform, wherein the at least two first additional work platforms are arranged on opposite lateral sides of the first work platform from each other; and
at least two second additional work platforms, each of which is arranged parallel to the second work platform and is height-adjustable relative to the second work platform, wherein the at least two second additional work platforms are arranged on opposite lateral sides of the second work platform from each other.

14. The support structure according to claim 13, wherein at least one of the two end members has a passageway, through which the first and second work platforms are accessible inside the core.

15. The support structure according to claim 13, wherein at least some of the fasteners are provided on the first work platform.

16. The support structure according to claim 13, wherein the chassis comprises two chassis modules spaced apart from each other about the axis of rotation of the core, each of the two chassis modules comprising a rotating support, which receives a longitudinal core end, and one or more rolling elements, which are configured to allow movement of the support structure.

17. An installation for assembling a fuselage portion comprising a plurality of stations, together with a support structure according to claim 13, wherein the support structure is mobile between the plurality of stations.

18. A method for assembling a fuselage section, the method comprising:
providing an installation according to claim 12;
attaching longitudinal fuselage portions to the support structure; and
moving, while the longitudinal fuselage portions attached to the support structure, the support structure between the plurality of stations of the installation.

19. The method according to claim 18, wherein the core comprises two end members, which are longitudinally spaced apart from each other, on opposite ends of the core, and at least one longitudinal beam, which connects the two end members together to form the first work platform, the method comprising:
moving the support structure to one of the plurality of stations of the installation;
performing operations on the longitudinal fuselage portions attached to the support structure, wherein the operations are carried out by at least one operator moving around on the first work platform, when the first work platform is oriented horizontally upwards;
rotating the core relative to the chassis, so that the second work platform is oriented horizontally upwards; and
performing operations on the longitudinal fuselage portions attached to the support structure, wherein the operations are carried out by at least one operator moving around on the second work platform, when the first work platform is oriented horizontally upwards.

* * * * *